United States Patent [19]

Eller et al.

[11] 4,237,342

[45] Dec. 2, 1980

[54] TELEPHONE HOOK-UP BOX

[76] Inventors: Harry J. Eller, 216 Birch Hill Dr., Rochester, Mich. 48063; Donald G. Eller, 39336 Farmhill Dr., Sterling Heights, Mich. 48078; Edward R. Dudek, 31465 Beechwood, Warren, Mich. 48093; Edward C. Goodwin, 1161 Devonshire, Grosse Pointe Park, Mich. 48230

[21] Appl. No.: 44,892

[22] Filed: Jun. 4, 1979

[51] Int. Cl.³ .............................................. H04M 1/18
[52] U.S. Cl. .............................. 179/1 PC; 179/91 R; 339/123
[58] Field of Search ..................... 179/1 PC, 91 R, 98; 339/122 R, 123, 151 C, 116 R, 156 R

[56] References Cited

U.S. PATENT DOCUMENTS

| | | | |
|---|---|---|---|
| 3,668,324 | 6/1972 | Firestone | 179/1 PC |
| 3,675,183 | 7/1972 | Drake | 339/123 |
| 4,061,411 | 12/1977 | Gumb et al. | 179/1 PC |
| 4,071,696 | 1/1978 | Anderson | 179/1 PC |
| 4,088,384 | 5/1978 | Gumb | 179/1 PC |

OTHER PUBLICATIONS

"Ship-Shape Communications for Boaters", *Telephony*, Oct. 20, 1975, pp. 20-21, Ray Blain.

*Primary Examiner*—Gerald L. Brigance
*Attorney, Agent, or Firm*—Krass and Young

[57] ABSTRACT

A telephone hook-up box for providing dockside telephone line hook-up to a mating connector plug. The hook-up box incorporates all of the connections necessary for hooking up the telephone lines and the respective line protectors and line continuity checking resistor. The box is formed of a two-piece body and cover portion of molded plastic. The cover is adapted to receive a locking type connector plug with a corresponding mating spring finger contact set disposed in a bore formed in the body element aligned with the cover openings. The spring contacts are integral with three molded-in-place contact-terminal elements which provide the terminal tab portions for both the telephone line and ground hook-ups and connection of the lines to a continuity checking resistor mounted in the body element. The ground contact-terminal elements are also formed with contact seat portions providing a grounding connection to the respective line terminal tab portions. The line protectors are received in threaded bores formed in the body element aligned with the contact seats and with openings in the line terminal tab portions to establish the necessary electrical connections. A hinged spring-biased cover disc is provided to provide a weather-proof closure of the plug connector openings in the box cover.

10 Claims, 7 Drawing Figures

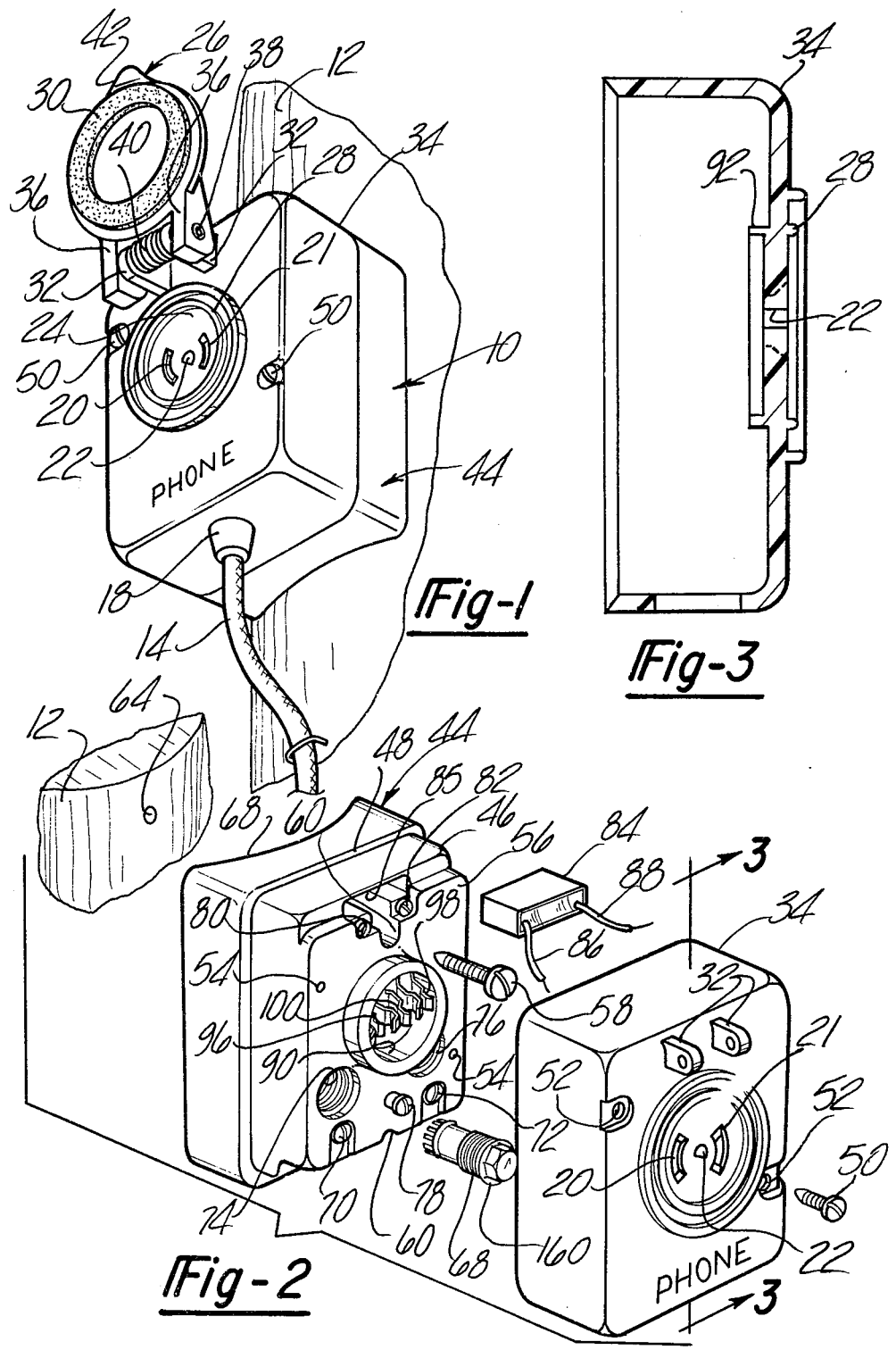

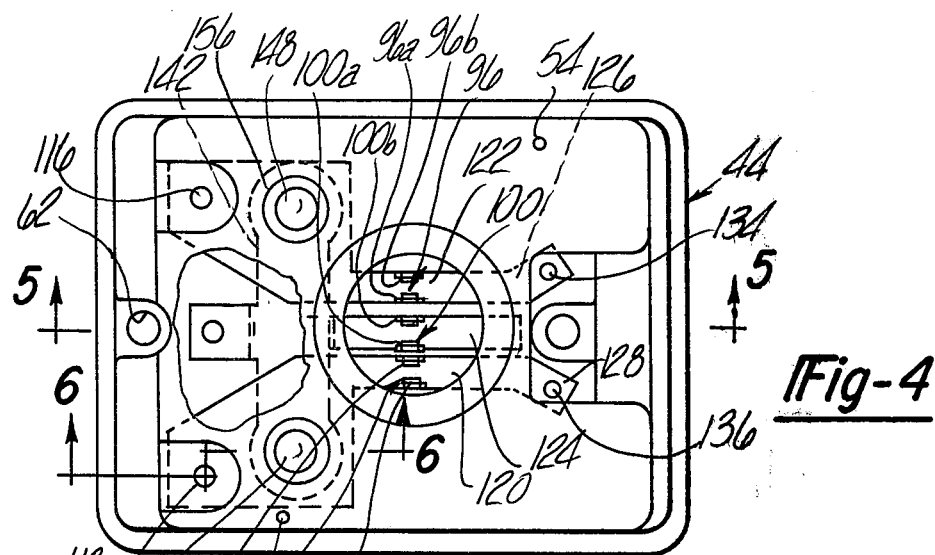
*Fig-4*
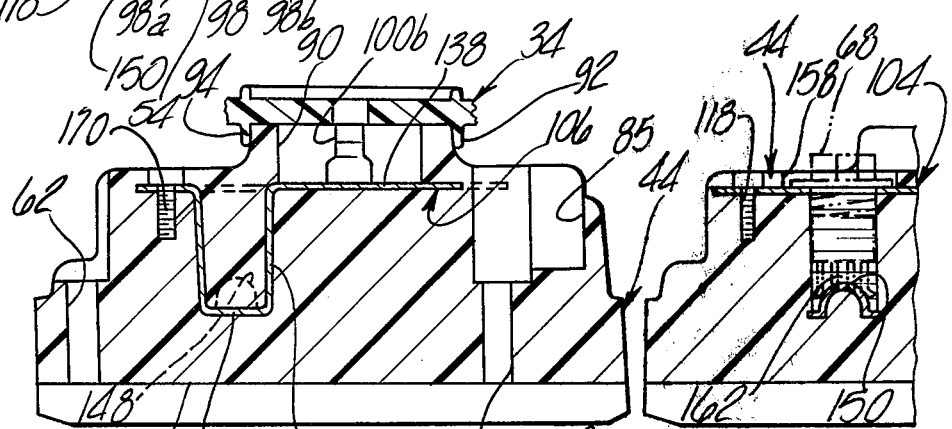
*Fig-5*  *Fig-6*
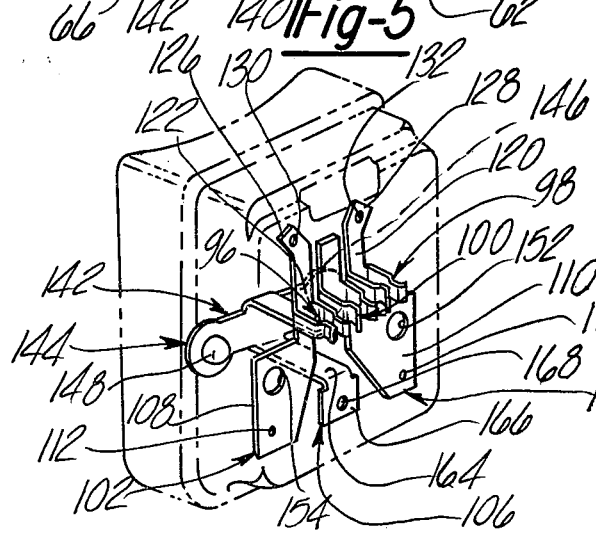
*Fig-7*

TELEPHONE HOOK-UP BOX

BACKGROUND DISCUSSION

In many telephone connection hook-ups, it is necessary to provide a junction box in order to connect the telephone lines with the wiring of the telephone system to be hooked up. In addition, it is conventional practice to provide line protectors which connect either or both of the lines to ground in the event high voltages are applied to the telephone lines, as by a power line coming into contact with the telephone wires. The line protectors are generally provided in a separate protector box mounted adjacent the junction box. There is also commonly included a continuity checking high ohm resistor connected across the telephone lines, which enables remote checking of line continuity and this necessitates additional electrical connections to be made.

Therefore, a hook-up involves the mounting of two separate box structures, as well as a number of electrical connections, and the hook-up procedure is relatively time consuming for installation personnel.

There is a further particular disadvantage in establishing a marine or dockside telephone service installation, since the junction box here takes the form of a female receptacle mating with a corresponding locking male plug, connected to the wiring on the docked boat, which is unplugged each time the boat leaves dockside. Thus, relatively extensive electrical connections must be made to the female receptacle and to the junction line and ground terminals, as well as to the separate protector box. Also, the necessary electrical line connections to the continuity checking resistor, if incorporated, must be made.

In an effort to reduce the labor and components required in making such telephone service hook-ups, there has been provided in the past a junction box with the female receptacle portion formed integrally. In addition, it has been heretofore provided for a junction box in which the protector components have been incorporated with a mounting of a female connector plug in a common hook-up box. However, it has not heretofore been provided for such a telephone hook-up box in which the female connector structure has been successfully combined with an integral line protector mounting arrangement, as well as the continuity resistor line connections.

The provision of the female connector structure as a separate element in the assembly adds considerably to the cost of the assembly of that unit with a separate installation step involved in physically mounting the female connector and additional labor is involved in making the electrical connections from the contact elements of the female connector to the other electrical elements in the hook-up box.

Accordingly, it is the object of the present invention to provide a telephone hook-up arrangement in which a female connector receptacle is an integrated component of a telephone hook-up box and in which all of the necessary electrical connections are provided by a minimum number of electrical contact elements such as to yield a combined junction-protector box assembly requiring only the electrical connections made to the telephone lines and grounding circuit, and the mounting of a single box in order to establish such telephone service with a minimum number of components and installation labor.

SUMMARY OF THE INVENTION

This and other objects of the present invention, which will become apparent upon a reading of the following specification and claims, are achieved by a telephone hook-up box consisting of a body element formed of molded material and into which is molded a pair of line contact-terminal elements, and a central ground contact-terminal element, each of the contact-terminal elements formed with a forwardly extending contact finger set, with the sets aligned within a bore molded into the body element and configured to mate with standard male connector plugs. A cover is provided, adapted to be fit over the front face of the body element and is formed with arcuate openings and a central rounded opening, which align with the contact finger sets to perform the function of the eliminated female receptacle, normally mating with the standard male connector plug. Each of the line contact-terminal elements is formed with terminal tab portions having openings aligned with threaded holes in the body element such as to accommodate terminal screws to secure the telephone line connections to the respective line contact-terminal elements.

A similar oppositely extending resistor terminal tab is also provided on each line contact-terminal element, similarly aligned with threaded openings in the opposite side of the body to enable electrical connections to be made to a continuity checking resistor. A pocket molded in the body adjacent and intermediate the resistor terminal tabs receives the resistor itself.

The grounding contact-terminal element is formed with a terminal tab portion disposed intermediate each of the line terminal tab portions and similarly provided with an opening aligned with a threaded hole in the body element to mount a terminal screw for connection to the ground circuit.

The ground contact-terminal element is also provided with a transversely extending and offset contact seat section, each end thereof formed with a rounded contact protuberance, each positioned at the bottom of a threaded bore formed in the body element. Each of the threaded bores are positioned aligned with an opening in an overlying portion of the line terminal tab portions.

This arrangement provides a mounting and electrical connection of the line protector elements which are threadably received in the threaded bores and placed into contact with the respective contact protuberances and the adjacent surface of the line terminal tab portions by a seating of a flanged portion of the line protector elements onto the upper surface thereof.

The cover is fit over the body element with a guiding annular protuberance on its inside surface adapted to be received over an upstanding boss portion molded into the body front surface, defining the contact bore to accurately locate the cover openings with respect to the contact spring finger sets. The cover serves to protect and shield the telephone line connections, as well as the other components.

A hinged cover disc seals the plug connector openings, which disc is hinged and spring biased into engagement with a pressure ridge formed on the cover and mating with a foam material gasket to provide a substantially weather-proof protection of the various elements.

The entire assembly is adapted to be mounted to supporting structure by means of screws passing through openings extending through the body portion.

DESCRIPTION OF THE DRAWINGS

FIG. 1 is a perspective view of a telephone hook-up box according to the present invention, shown installed on a mounting structure.

FIG. 2 is an exploded perspective view of the mounted telephone hook-up box depicted in FIG. 1.

FIG. 3 is a view of the section 3—3 taken through the cover element of FIG. 2.

FIG. 4 is a plan view of the body portion depicted in FIG. 2, a portion thereof broken away to depict the interior details.

FIG. 5 is a view of the section 5—5 taken in FIG. 4.

FIG. 6 is a view of the section 6—6 taken in FIG. 4.

FIG. 7 is a perspective view of the contact-terminal elements shown in their relative positions molded in the interior of the body element, which is depicted in phantom.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the hook-up box 10, according to the present invention, is particularly adapted to marine, dockside hook-ups in which the hook-up box 10 is mounted to a dock piling 12 adjacent the boatwell for the boat on which the telephone service is to be provided.

The telephone company cable 14, containing the "L1" and "L2" telephone signal lines and the grounding lead are both introduced through the cover opening 16 sealed by means of a rubber grommet 18.

The on-board telephone system is connected to the hook-up box 10 when service is desired by a male locking type plug which is inserted into arcuate openings 20 and central "D" opening 22 formed in the front recess 24 molded in the cover 34. The front recess 24 is protected by a hinged disc cover 26 which is normally biased into sealing engagement with a pressure ridge 28 mating with a foam material gasket 30 bonded to the inside surface of the hinged disc cover 26.

The hinging is provided by a pair of integral clevises 32, integral with the cover 34, and by a pair of clevises 36 formed on the hinged disc cover 26 with a roll pin 38 providing a pivoting support therefor.

A wind-up spring 40 provides a biasing force urging the hinged disc cover 26 to the closed position. A lifting tab 42 provides easy grasping of the cover for lifting to the open position and installation of the male connector plug (not shown).

Referring to FIG. 2, the major components of the telephone hook-up box 10 comprise a generally box-shaped body element 44, in addition to the previously mentioned cover 34.

The cover 34 is configured to be slidably received over a shoulder 48 formed about the periphery of the body element 44 and secured thereto by a pair of screws 50 passing through openings 52 formed in the cover 34 and seated in threaded holes 54 on the upper surface 56 of the body element 44. Body element 44 in turn is secured to the dock piling 12 or other supporting structure by a pair of screws 58 received into recesses 60 aligned with through bores 62 (FIG. 5) molded into the body element 44 and into drilled holes 64 drilled into the dock piling 12 installation.

The reverse surface 66 of the body element 44 is curved in order to accommodate mounting to curved surfaces such as the aforementioned dock piling 12.

The body element 44 also serves to mount a pair of line protectors 68 and which are normally incorporated in telephone line installations, while only one is shown in FIG. 2. Each of those are associated with respective telephone lines L1 and L2, which are in turn electrically connected to terminal screws 70 and 72. Each of the line protectors 68 are received within respective bores 74 and 76 which are formed threads which mate with the external threads normally provided on line protectors 68.

In turn, electrical connections are provided internally, as will be described, such as to provide an electrical connection between one side of the line protector 68 and a ground circuit connected to a ground terminal 78, whereas the other side of the line protectors 68 are electrically connected to the respective terminal screws 70 and 72.

The line protectors 68 operate in a well-known fashion to cause a grounding out of either or both of the lines connected to the terminal screws 70 and 72 to the ground circuit, via ground terminal 78 in the event of excessively high voltage being applied thereto as may occur by accidental contact of the telephone lines with high voltage power lines.

Also electrically connected to the terminal screws 70 and 72 are resistor terminal screws 80 and 82 which are connected in turn to a high ohmage resistor 84, having respective leads 86 and 88 secured to the resistor terminal screws 80 and 82. This enables a continuity check to be made as to each of the telephone signal lines L1 and L2 by a remote signaling equipment, to remotely detect fault conditions or open circuits in these lines in a manner well known to those skilled in the art.

A bore 90 extends into the upper surface 56 of the body element 44 which is positioned in alignment with the front recess 24 of the cover 34 at assembly by mating of an annular protuberance 92 formed on the inside surface of the cover 34 and a boss 94 molded integrally with the body element 44 extending about the bore 90.

Extending across the bore 90 is a series of three contact sets formed by opposed spring finger pairs 96, 98 and 100. The contact sets 96 and 98 are in alignment with a respective one of arcuate openings 20, while the central "D" opening 22 is aligned with the centrally disposed contact set 100.

The lefthand contact set 96 is electrically connected to the line terminal screw 70, while the righthand contact set 98 is electrically connected to the other line terminal screw 72, and the central contact set 100 is electrically connected to the ground terminal 78, all by the internal details to be described hereinafter.

Thus, upon insertion of the male connector plug (not shown) into the openings 20 and 22, an electrical connection therewith is established via contact sets 96, 98 and 100.

The standard plug connector for installations of this nature is of a well-known and standard locking type, wherein the plug is inserted into the arcuate openings and rotated into a locking condition with the plug pins passing in between the contact sets, with the respective plug pins locked in contact. Since such connector is well known, the details thereof are not here included.

It can be appreciated at this point that the entire installation requires only the installation of two screws 58 and three electrical connections to the terminal screws 70, 72 and 78. All of the other connections are made internally or at assembly of the hook-up box 10, in the case of the resistor leads to the resistor terminal screws 80 and 82.

Referring to FIGS. 4 through 7, the internal details of the hook-up box 10 contained within the body element 44 are revealed, which provide for the appropriate electrical connections between the terminal tabs and contact sets as described in connection with the description of FIG. 2.

As best seen in FIG. 7, all of the internal electrical connections are provided by three simple, one-piece contact-terminal elements, each molded in place within the body element 44, i.e., two line contact-terminal elements 102 and 104, and a ground contact-terminal element 106. Each of these are of a simple formed metal configuration, with the ground contact-terminal element 106 positioned intermediate the line contact-terminal elements 102 and 104.

The line contact-terminal element 102 is formed integrally with the contact set 96, while the line contact-terminal element 104 is formed with the contact set 98. The ground contact-terminal element 106 is integrally formed with the contact set 100.

Each of the line contact-terminal elements 102 and 104 have terminal tab portions 108 and 110 formed integrally therewith which extend down away from the contact sets to the point where the terminal screws 70 and 72 are mounted.

As can be seen in FIG. 5, the terminal tab portions 108 and 110 are each formed with small holes 112 and 114, respectively, which are in alignment with threaded holes 116 and 118, respectively, adapted to receive the terminal screws 70 and 72, respectively, with the lines being drawn into electrical contact with the terminal tab portions 108 and 110 thereby establishing electrical connection to corresponding contact sets 96 and 98.

Each of the spring finger contact sets 96, 98 and 100 are provided by opposing upstanding fingers, i.e., the contact set 96 comprises spring fingers 96A and 96B; contact set 98 comprises spring fingers 98A and 98B; while contact set 100 comprises spring fingers 100A and 100B.

The terminal portions of each of these are formed towards and away from each other to provide a spring fit with the contact passed therebetween in a manner well known in the art. Each of the spring fingers 98A and 98B are formed with an intermediate flat metal strip 120, while spring fingers 96A and 96B are formed from a flat metal strip 122. Finally, spring fingers 100A and 100B are formed integrally with the intermediate metal strip 124.

All of the strips 120, 122 and 124 extend parallel to the upper surface 56, but are contained within the molded plastic material after passing out of the region at the bottom of the bore 90. Each of the strips 120 and 122 are integral with the terminal tab portions 108 and 110 and extend directly therefrom such as to lie in the same plane.

The line contact-terminal elements 102 and 104 are also provided with resistor terminal tab portions 126 and 128, respectively, formed by terminal portions of the strips 120 and 122 extending oppositely from the terminal tab portions 108 and 110 as thus seen in FIG. 7.

Each of the resistor terminal tab portions 126 and 128 are formed with clearance openings 130 and 132, respectively, which are aligned with molded threaded bores 134 and 136 in similar fashion to threaded holes 116 and 118 such as to accept the resistor terminal screws 80 and 82 and establish electrical connection with the resistor leads 86 and 88.

The ground contact-terminal element 106 includes the intermediate strip 138 with the spring fingers 100A and 100B formed integrally therewith.

Strip 138 extends into a formed portion extending rearwardly away from the upper surface 56, by an intermediate portion 140 which electrically connects to an offset transverse strip 142 having ends 144 and 146 extending in opposite directions as best seen in FIG. 2 from the intermediate portion 140.

Each end 144 and 146 provides contact seats 148 and 150 formed by respective rounded protuberances directed upwardly towards the upper surface 56. Each contact seat 148 and 150 is also positioned in alignment with the bores 74 and 76, in turn aligned with round openings 152 and 154 formed in the terminal tab portions 108 and 110. Counterbores 156 and 158 of larger diameter than the round openings 152 and 154 are also provided which are sized to accept a flange 160 formed on the line protectors 68.

Thus, upon being threaded into the bores 74 and 76, the flanges 160 make electrical contact with the respective aligned line contact-terminal elements 102 and 104 by contacting the upper surface of the terminal tab portions 108 and 110, respectively, as indicated by the phantom description of line protector 68 in FIG. 6, shown in the installed position.

The line protectors 68 are provided with spring-loaded contacts 162 which insure contact with the contact seats 148 and 150. This thus establishes an overload grounding connection of the respective terminal screws 70 or 72 upon a high voltage condition being impressed on either of the lines which causes the protectors to become conductive and make an electrical connection with the ground contact-terminal element 106 to protect the telephone equipment in the manner well known in the art.

The ground contact-terminal element 106 is provided with a further intermediate section 164 extending back outwardly towards the upper surface of the body element 44 and with a last outwardly bent terminal tab portion 166 being formed with a clearance hole 168 in alignment with a threaded hole 170 molded into the body element 44 and accommodating the ground terminal 78.

It can therefore be seen that by three separate contact-terminal elements 102, 104 and 106 molded in place within the body element 44, all of the necessary electrical connections can be provided for both the junction box and the protectors, as well as the line continuity resistor and, when making an installation, only connections to the terminal screws 70, 72 and 78 are necessary, and the installation of the mounting screws 58 and the cover screws 50.

At the same time, the device is relatively rugged, simple and weatherproof and is able to be manufactured at low cost since the internal connections need not be made with a corresponding female connector, which component is itself eliminated.

The embodiments of the invention in which an exclusive property or privilege is claimed are defined as follows:

1. A telephone hook-up box comprising:

a molded body element;

a pair of strip metal line contact-terminal elements and a strip metal ground contact-terminal element, each of said line and ground contact-terminal elements being molded within said body element and each including integrally formed pairs of spring fingers comprising contact sets extending into a bore formed in said body element, said spring fingers being formed along side an intermediate section of each of said contact terminal elements;

each contact-terminal element further including a terminal tab portion extending into an opening formed in said front face of said body element to enable an electrical connection to be made therewith adjacent said front face of said body element;

said ground contact-terminal element further including a transverse section having opposite ends forming contact seats, said transverse section offset away from said front face of said body element and including an integral offsetting portion intermediate said front face of said body element to offset said transverse section and said contact seat ends from said line terminal tab portions, each of said opposite ends extending beneath a respective one of said line contact-terminal element terminal tab portions;

a pair of threaded bores extending into said body element away from said body element front face into registry with a respective one of said contact seat end portions and said line contact-terminal tab portions;

a circular hole aligned with said threaded bore formed in each of said terminal tab portions of said line contact-terminal element, said front face of said body element being formed with a counterbore aligned therewith;

whereby line protectors may be threaded into said molded threaded bores providing an electrical contact with the upper surface of said contact element and with said contact seat end portion to provide grounding overload protection for said telephone load lines;

a cover mounted over said front face of said body element, said cover being formed with a pair of arcuate opening slots and a central opening therebetween, said arcuate slots being aligned with respective one of each of said line contact-terminal element contact sets, said central opening aligned with said intermediate ground contact set.

2. The telephone hook-up box according to claim 1 wherein each of said line contact-terminal elements is formed with resistor terminal tab portions, each extending away from said contact set intermediate sections and into registry with an opening formed into said front face of said body element and wherein said body element is formed with a pocket intermediate said resistor terminal tab portions adapted to receive a continuity resistor and provide an electrical connection across said line contact-terminal elements via said resistor tab portions adjacent thereto.

3. The telephone hook-up box according to claim 1 wherein said exposed openings extending into said front face of said body element are aligned with threaded holes disposed beneath said terminal tab portions, whereby a terminal connector screw is threaded into said molded body element to provide an electrical connection against said exposed surface of each of said terminal tab portions.

4. The telephone hook-up box according to claim 1 wherein said body element is formed with a forwardly extending boss extending about said bore wherein said contact sets are disposed, and wherein said cover is formed with a corresponding mating protuberance extending rearwardly from said cover element, whereby said cover is located with respect to said bore to align said openings in said cover with said contact sets.

5. The telephone hook-up box according to claim 4 wherein said cover is formed with an opening into a side thereof corresponding to the position of said terminal tab portions whereby leads may be extended into said cover for connection to said terminal tab portion.

6. The telephone hook-up box according to claim 1 further including a disc cover pivotally mounted to said cover to be able to be moved into sealing engagement with a recess formed in said cover formed with said arcuate and central openings and further including spring bias means urging said disc cover into said sealing engagement therewith, whereby to provide protection for the interior of said telephone hook-up box.

7. The telephone hook-up box according to claim 2 wherein each of said line contact-terminal elements comprises a flat strip extending substantially parallel to said front face of said box element with opposite ends thereof comprising said terminal tab portions and said resistor terminal tab portions.

8. The telephone hook-up box according to claim 7 wherein each of said contact sets of said contact-terminal elements and said ground terminal elements are aligned in said bore with said ground terminal contact sets positioned intermediate said line contact sets located on either side thereof.

9. The telephone hook-up box according to claim 8 wherein each of said line and ground terminal tab portions are in substantial alignment with each other adjacent a side of said body element.

10. The telephone hook-up box according to claim 9 wherein said body element comprises a generally rectangular block form and wherein said cover element is of rectangular shape to be fit over said front face.

* * * * *